United States Patent
Schlaich et al.

(10) Patent No.: US 9,296,106 B2
(45) Date of Patent: Mar. 29, 2016

(54) METHOD FOR OPERATING A SAFETY DEVICE FOR A HANDLING DEVICE, SAFETY DEVICE FOR A HANDLING DEVICE, AND HANDLING DEVICE

(75) Inventors: Peter Schlaich, Leonberg (DE); Frank Roethling, Schwieberdingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 211 days.

(21) Appl. No.: 13/994,460

(22) PCT Filed: Dec. 9, 2011

(86) PCT No.: PCT/EP2011/072330
§ 371 (c)(1),
(2), (4) Date: Sep. 26, 2013

(87) PCT Pub. No.: WO2012/080123
PCT Pub. Date: Jun. 21, 2012

(65) Prior Publication Data
US 2014/0025204 A1    Jan. 23, 2014

(30) Foreign Application Priority Data
Dec. 16, 2010   (DE) .......................... 10 2010 063 208

(51) Int. Cl.
| | | |
|---|---|---|
| G05B 19/04 | (2006.01) | |
| B25J 9/16 | (2006.01) | |
| B25J 13/08 | (2006.01) | |
| B25J 19/06 | (2006.01) | |

(52) U.S. Cl.
CPC .............. *B25J 9/1676* (2013.01); *B25J 13/086* (2013.01); *B25J 19/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,821,584 | A * | 4/1989 | Lembke ..................... | 73/862.68 |
| 5,363,474 | A * | 11/1994 | Sarugaku et al. ............ | 700/256 |
| 5,744,728 | A * | 4/1998 | Suita et al. ............... | 73/862.542 |
| 7,533,798 | B2 * | 5/2009 | Jones et al. .................. | 235/375 |
| 2006/0178775 | A1 * | 8/2006 | Zhang et al. ................. | 700/245 |
| 2007/0194097 | A1 * | 8/2007 | Jones et al. .................. | 235/375 |
| 2010/0217528 | A1 * | 8/2010 | Sato et al. ..................... | 701/301 |
| 2011/0036188 | A1 * | 2/2011 | Fujioka et al. ................. | 74/405 |
| 2011/0264266 | A1 * | 10/2011 | Kock ........................... | 700/253 |

FOREIGN PATENT DOCUMENTS

| | | |
|---|---|---|
| CN | 1749135 | 3/2006 |
| DE | 10 2007 062 245 | 6/2009 |

(Continued)

OTHER PUBLICATIONS

International Search Report for PCT/EP2011/072330, dated Jul. 18, 2012.

*Primary Examiner* — Bhavesh V Amin
(74) *Attorney, Agent, or Firm* — Kenyon & Kenyon LLP

(57) ABSTRACT

In a method for operating a safety device for a handling device, e.g., an industrial robot having a movable gripper device and at least one sensor device at least largely surrounding the gripper device for recognizing at least possible collisions with objects located in the motion path of the gripper device, a signal is output to a control unit upon recognizing a collision risk, resulting in a modified motion sequence of the gripper device on its motion path, which modified motion sequence is a controlled reduction in the motion velocity of the gripper device.

5 Claims, 1 Drawing Sheet

(56) References Cited

FOREIGN PATENT DOCUMENTS

| | | |
|---|---|---|
| DE | 10 2008 063081 | 8/2010 |
| EP | 0 158 593 | 10/1985 |
| EP | 0 518 836 | 12/1992 |
| EP | 1 323 503 | 7/2003 |
| FR | 2 663 105 | 12/1991 |
| JP | 08-11085 | 1/1996 |
| JP | 11-226889 | 8/1999 |
| JP | 2004268689 A | 9/2004 |
| JP | 2006068857 A | 3/2006 |
| JP | 3140561 U | 4/2008 |
| JP | 2009012701 A | 1/2009 |
| JP | 2010503096 A | 1/2010 |

\* cited by examiner

US 9,296,106 B2

METHOD FOR OPERATING A SAFETY DEVICE FOR A HANDLING DEVICE, SAFETY DEVICE FOR A HANDLING DEVICE, AND HANDLING DEVICE

BACKGROUND OF THE INVENTION

1. Field of the Invention

The present invention relates to a method for operating a safety device for a handling device. Furthermore, the present invention relates to a safety device for a handling device and a handling device.

2. Description of the Related Art

A method of this type for operating a safety device for a handling device is already known from published German patent application document DE 10 2007 062 245 A1. Here, the safety device has a shell surrounding the handling device in the form of a fillable medium storage device, which is in operative connection with a pressure sensor. When a collision is recognized, the pressure sensor responds, whereupon the gripper arm is stopped or moved in an opposite direction. Since the safety device does not respond until contact or collision with an object, for example, an inanimate object or a person, has already occurred, the necessary change in motion or stopping must occur in an extremely short period of time in order to prevent damage or injury. Therefore, when a collision of this type is recognized, an "emergency stop" of the handling device or of the gripper arm is usually performed. An "emergency stop" of this type has, however, the disadvantage that the motion velocity is not reduced to the value zero in a controlled manner. After the collision risk has been eliminated, the gripper arm must be brought back into a certain position, for example, from which a predetermined motion sequence is possible or the control program must be resynchronized with the gripper arm motion.

Furthermore, it is known from published European patent application document EP 1 323 503 A2 to provide a multi-stage sensor system in order to make possible a risk-free operation of the handling device involving human interaction. The method is based on tactile function principles, although a capacitive sensor principle is described as a possible sensor principle. The capacitive sensor principle, however, has only a supplementary function, i.e., it is usable only together with additional safety mechanisms such as a foam padding or a tactile sensor system. A targeted, collision-free braking action is thus not provided. In the last-named safety device, a foam padding shell surrounding the handling device is, in particular, also used for dampening or absorbing the impact energy generated in the collision.

BRIEF SUMMARY OF THE INVENTION

An object of the present invention is to refine a method for operating a safety device for a handling device, in particular an industrial robot, in such a way that, in particular, simplified restart or continued operation of the handling device is possible when the collision risk no longer exists. The present invention is based on the idea that, when a collision risk is recognized, a modified motion sequence of the gripper arm is provided, the modified motion sequence being a controlled reduction of the motion velocity of the gripper arm. In other words, this means that, in contrast to the related art, no "emergency stop" operation takes place, but a controlled reduction of the motion velocity, this having the advantage that the instantaneous position of the gripper arm is reliably recognized, so that either continued operation of the handling device at reduced motion velocity of the gripper arm if necessary or stopping of the gripper arm up to a standstill takes place, the standstill position of the gripper arm being reliably recognized, so that starting directly from this position in the event of restart is possible.

In a first embodiment of the present invention it is provided that the reduction in the motion velocity occurs until standstill of the gripper device. In particular in the case where the object is a human person, a motion pattern of the gripper arm is thus achieved which is easily detected by the person.

Particularly preferred is a specific embodiment in which the reduction in the motion velocity occurs as a function of the particular detected distance of the object from the motion path of the gripper device. In other words, this means that, on the one hand, the operation of the handling device itself continues (at a reduced velocity) even in the event of an approaching object, whereby the productivity of the handling device is only relatively slightly affected and, on the other hand, this makes it possible to always provide an instantaneous motion velocity of the gripper device from which reliable stopping of the gripper device without the risk of a collision with the object is made possible, considering the instantaneous distance between the gripper device and the object.

Particularly preferred is furthermore that after a reduction in the motion velocity, the motion velocity of the gripper device is flexibly adapted to the detected distance from the object, i.e., if necessary, it is increased again to an original setpoint motion velocity. The performance of the handling device is thus optimized, i.e., in the case where a collision risk with the object no longer exists it resumes its original motion velocity and thus performs as it did originally.

In order to ensure reliable recognition of possible collisions, according to another preferred method, it is proposed that the signals of multiple sensor elements be processed, at least two of the sensor elements having the same detection area. This means that the different signals may be compared to each other, so that even in the event of failure of one sensor element, the control unit is, for example, still able to recognize a possible collision risk and respond accordingly.

It may be furthermore provided that the signals of multiple sensor elements are processed, at least two of the sensor elements working by different measurement principles. This also makes, in particular, an always reliable operation of the safety device possible even under varying environmental conditions.

In another embodiment of the present invention, it is provided that the change in motion velocity of the gripper device is controlled as a function of the approach velocity between the gripper device and the object. This means that in the case of a relatively high approach velocity, a relatively rapid and abrupt braking of the gripper device occurs in order to avoid a possible collision. In contrast, in the case of a relatively low approach velocity, an appropriately slighter reduction in the motion velocity of the gripper device is effected.

The present invention also includes a safety device for a handling device, in particular an industrial robot having at least one sensor device for recognizing possible collisions and a control unit for operating the safety device. It is provided here that the gripper device has gripper fingers, which are designed to yield, in the event of a collision, in the direction of the collision. This makes an interactive operation between a person and an industrial robot possible, in which the operator shifts or removes an object shortly before the gripper arm grips it, there being a risk, due to the short distance between the operator's hand and the gripper fingers, that the gripper fingers grip or injure the operator's hand. Due to the very high approach velocity between the operator's hand and the gripper fingers, known sensor principles or security measures often fail in this case. In order to still avoid or at least alleviate injury to the operator, the gripper fingers are designed to yield in the direction of the collision.

In another, particularly preferred embodiment of the present invention, it is provided that the gripper device is surrounded by an impact-absorbing padding, whose thickness is adapted to a braking distance of the gripper arm up to a standstill.

Further advantages, features, and details of the present invention are derived from the following description of preferred exemplary embodiments and the drawing.

DETAILED DESCRIPTION OF THE INVENTION

Figure 1:
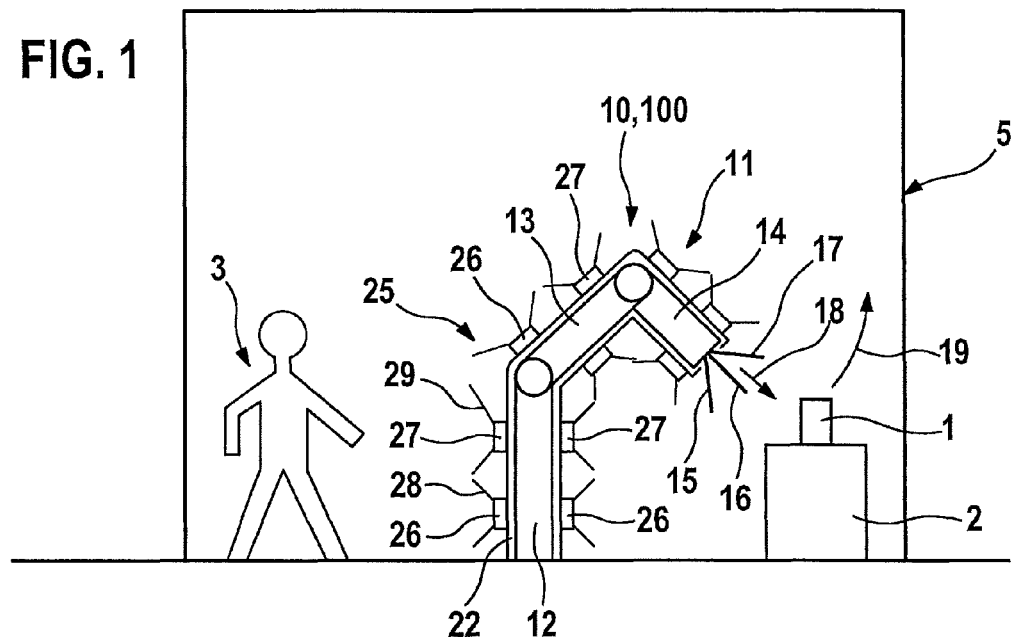
FIG. 1 shows a simplified illustration of an industrial robot situated in a work area and having a safety device according to the present invention.

Identical components or components having identical functions are provided with identical reference numerals in the figures.

FIG. 1 shows, in a highly simplified form, a handling device 10 in the form of an industrial robot 100. Handling device 10, i.e., industrial robot 100, has a multi-axis gripper device 11. Gripper device 11 includes a column 12, which is connected to two movably situated carriers 13, 14. At the end of one carrier 14, three gripper fingers 15 through 17 are situated, as an example, using which an object or a component 1, which is symbolically illustrated in FIG. 1 and situated on a table 2, may be gripped.

Column 12 and carriers 13, 14 are mounted in rotating or swiveling shafts not described or illustrated in greater detail, so that gripper device 11 or gripper fingers 15 through 17 may move to reach any point in space located within work area 5. Work space 5 thus forms the system boundary of gripper device 11. This makes it possible in particular, for example, to pick up component 1 from table 2 and to transport it to another point within work space 5, where, for example, component 1 is assembled with other components (not illustrated).

FIG. 1 shows the case where gripper fingers 15 through 17 approach component 1, which is illustrated by a first path section 18. After gripping component 1, the gripper device moves to the discussed point within work space 5, which is to be indicated by a second path section 19. The two path sections 18, 19 form a motion sequence stored in handling device 10 or a motion path of gripper device 11; gripper device 11 and gripper fingers 15 through 17 may be moved at different velocities on the motion path.

Handling device 10 is surrounded, at least in the area of column 12 and carriers 13, 14, by an impact-absorbing padding 22, whose thickness is adapted or dimensioned in such a way that in the event of a possible collision with an object 3, e.g., an operator, gripper device 11 may be stopped on the motion path, without damaging object 3.

Furthermore, handling device 10 includes a sensor device 25, which has, for example, a plurality of individual sensor elements 26, 27 having detection areas 28, 29. Sensor device 25 is situated, as an example, on the outside of padding 22 in such a way that, when gripper device 11 is moved, sensor elements 26, 27 are able to detect any point in space located on the motion path.

Capacitive sensor elements 26, 27, which emit an appropriate signal to a control unit 30 of handling device 10 when a relative approach occurs between sensor elements 26, 27 and object 3, are used, in particular, as sensor elements 26, 27. However, different measurement principles for sensor elements 26, 27 are basically conceivable. For example, sensor elements 26, 27 operating on an ultrasound or a radar basis may also be used. What is essential is only that an object 3 is detected or found within detection areas 28, 29 with the aid of sensor elements 26, 27 before object 3 collides with or contacts handling device 10.

Figure 2:
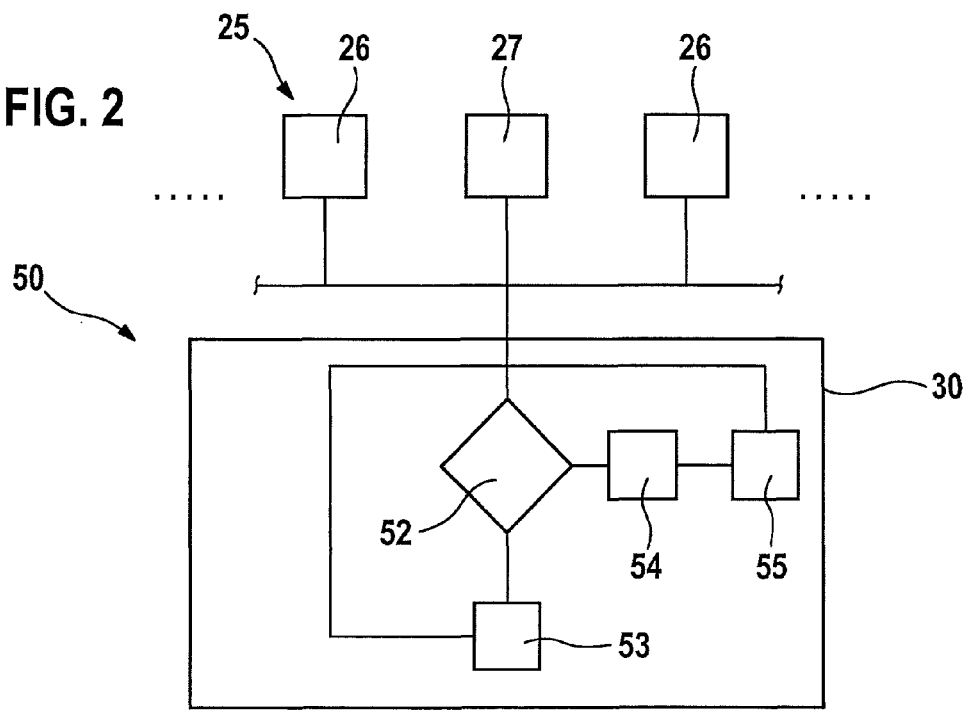
FIG. 2 shows a block diagram for illustrating the method according to the present invention for operating the safety device.

Sensor elements 26, 27 described so far form, together with control unit 30, a safety device 50 for handling device 10. Their mode of operation is now elucidated in greater detail with reference to FIG. 2: it is apparent that sensor elements 26, 27 are connected to control unit 30 in a signal-conducting manner. An anticollision program or a corresponding algorithm, which processes the signals received, preferably continuously, by sensor elements 26, 27 regarding the existence of an object 3 within detection area 28, 29, is stored in control unit 30. In a first program step 52, it is queried whether a signal regarding an object 3 located in detection area 28, 29 is being reported by sensor elements 26, 27. If this is not the case, a certain motion sequence or a certain motion path 20 of gripper device 11 is followed according to second program step 53, i.e., handling device 10 works in its normal operation in which parts 1 are handled in the desired manner.

In contrast, if, in first program step 52, one of sensor elements 26, 27 reports an object 3 within detection area 28, 29, the corresponding sensor element 26, 27, is located, if necessary, in another program step 54. Since sensor elements 26, 27 preferably generate appropriate signals in equally long time intervals, a corresponding approach velocity between object 3 and sensor element 26, 27 or handling device 10 may be additionally inferred, for example, from the particular signal intensities. It is also possible to ascertain, from the detected or transmitted signals of sensor elements 26, 27 whether or not a potential collision of object 3 with gripper device 11 may occur in the area of motion path 20.

If there is the risk of a potential collision, in a next program step 55, a controlled reduction in the motion velocity of gripper device 11 is carried out in such a way that, depending on the instantaneous distance between object 3 and motion path 20 or on the approach velocity between object 3 to motion path 20, a reduction in the velocity, to the value zero, if needed, occurs at the potential contact point. It is essential here that this is a controlled reduction in the motion velocity of gripper device 11, i.e., control unit 30 is able to detect the exact location of gripper device 11 or of gripper fingers 15 through 17 at any given point in time.

It is particularly preferred that the change or reduction in the motion velocity of gripper device 11 occurs as a function of the particular distance between object 3 and handling device 10 or of the corresponding approach velocity. This means that in the case where the distance between object 3 and handling device 10 increases again on its motion path, the motion velocity of gripper device 11 is increased again, possibly to a setpoint velocity corresponding to normal operation of gripper device 11. A velocity or performance optimization of handling device 10 thus occurs as soon as an object 3 is at a possible collision risk with handling device 10.

However, it may also be provided that, when an object is detected by one of sensor elements 26, 27, a controlled reduction in the motion velocity of gripper device 11 up to a standstill occurs. As soon as no object is detected, the motion velocity is increased again to its original value.

It is also pointed out that safety device 50 or handling device 10 described so far may be modified in multiple ways without deviating from the inventive idea. It is particularly advantageous to use, as sensor elements 26, 27, sensor elements working by different measurement principles (for example, capacitively working sensor elements 27 and sensor elements 27 working by the ultrasound principle). It is furthermore conceivable and advantageous, for increasing operational reliability, if at least two sensor elements 26, 27 both have an identical detection area 28, 29 in such a way that the same area in work space 5 is monitored with the aid of corresponding detection area 28, 29. In addition, it is also possible that gripper fingers 15 through 17 are situated or fastened in a force-fitted manner on carrier 14 in such a way that in the case where, for example, an operator grips component 1, gripper fingers 15 through 17 may get into contact with the operator's hand, but they are designed to yield in the direction of the collision, so that at least serious injuries to the operator may be ruled out.

What is claimed is:

1. A method for operating a safety device for a handling device configured as an industrial robot having a movable gripper device and at least one sensor device at least largely surrounding the gripper device, comprising:
   detecting, with the aid of the at least one sensor device, at least a possible collision with an object located in a motion path of the gripper device;
   outputting, by the sensor device, a signal to a control unit upon detecting a collision risk; and
   modifying, by the control unit, a motion sequence of the gripper device on the motion path, wherein the modified motion sequence is a controlled reduction in a motion velocity of the gripper device;
   wherein, after initiating the reduction in the motion velocity, the motion velocity is variably adapted to dynamically varying detected distance of the object from the motion path of the gripper device.

2. The method as recited in claim 1, wherein signals from multiple sensor elements are output to the control unit, at least two of the sensor elements having the same detection area.

3. The method as recited in claim 2, wherein the at least two of the sensor elements having the same detection area operate on different measurement principles.

4. A safety device for a handling device configured as an industrial robot, comprising:
   at least one sensor device for recognizing a possible collision with an object located in a motion path of a gripper device of the handling device; and
   a control unit configured to modify a motion sequence of the gripper device on the motion path upon recognizing the possible collision with the object, wherein the modified motion sequence is a controlled reduction in a motion velocity of the gripper device without instantly stopping the gripper device, to enable determination of the instantaneous position of the gripper device during the entire duration of the controlled reduction in the motion velocity, and wherein the gripper device has gripper fingers which are configured to yield, in the event of a collision with the object, in a direction of the collision, and wherein the gripper device is surrounded by an impact-absorbing padding which has a thickness adapted to a braking distance of the gripper device to standstill.

5. An industrial robot, comprising:
   a movable gripper device;
   at least one sensor device at least largely surrounding the gripper device for recognizing at least possible collision with an object located in a motion path of the gripper device; and
   a control unit configured to modify a motion sequence of the gripper device on the motion path upon recognizing the possible collision with the object, wherein the modified motion sequence is a controlled reduction in a motion velocity of the gripper device, and wherein the gripper device has gripper fingers which are configured to yield, in the event of a collision with the object, in a direction of the collision.

\* \* \* \* \*